Jan. 23, 1951     B. J. HAWKINS     2,539,077
TEACHING DEVICE
Filed Aug. 31, 1946     2 Sheets—Sheet 1
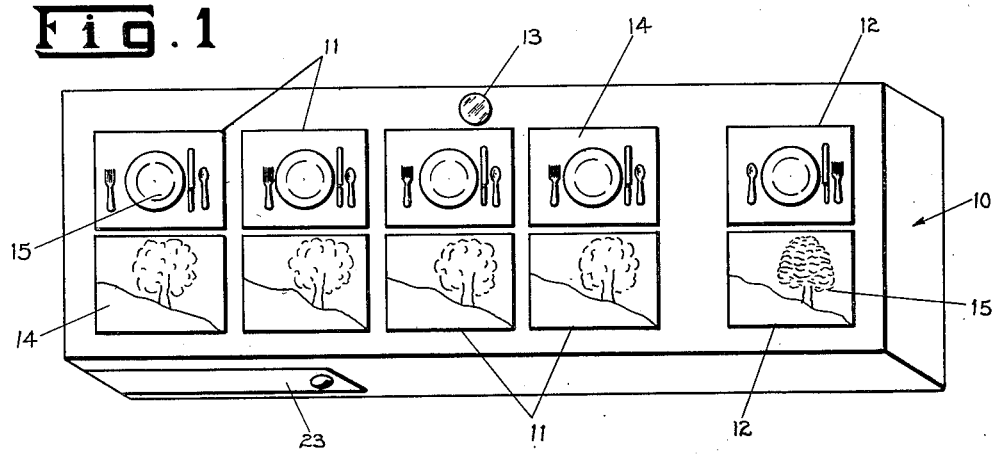
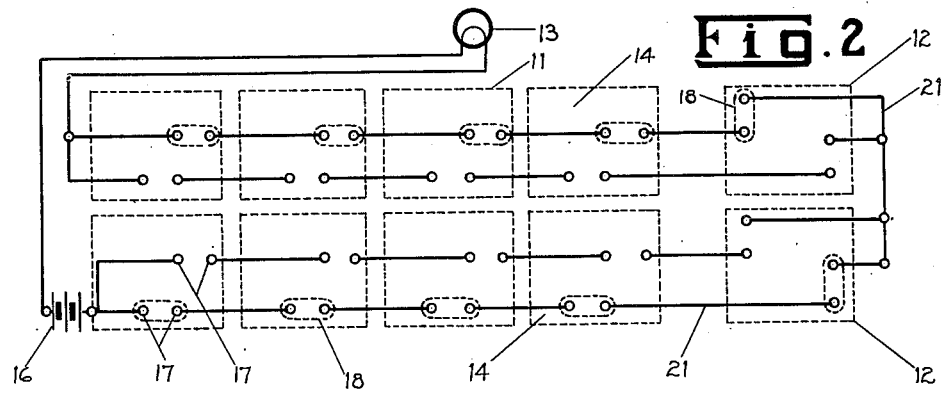
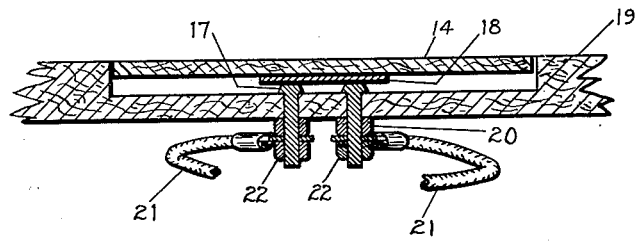
BARBARA J. HAWKINS
*INVENTOR.*
BY
ATTORNEYS Jan. 23, 1951  B. J. HAWKINS  2,539,077
TEACHING DEVICE
Filed Aug. 31, 1946  2 Sheets-Sheet 2
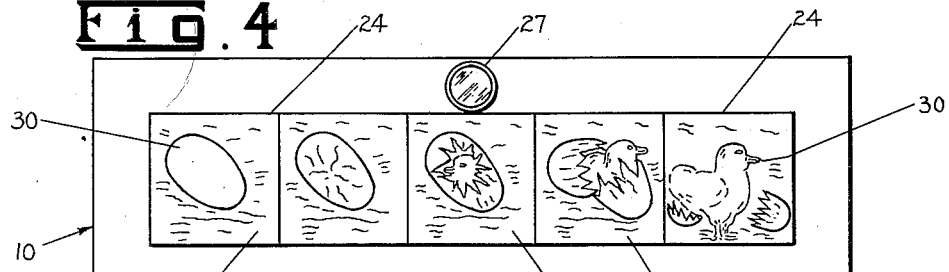
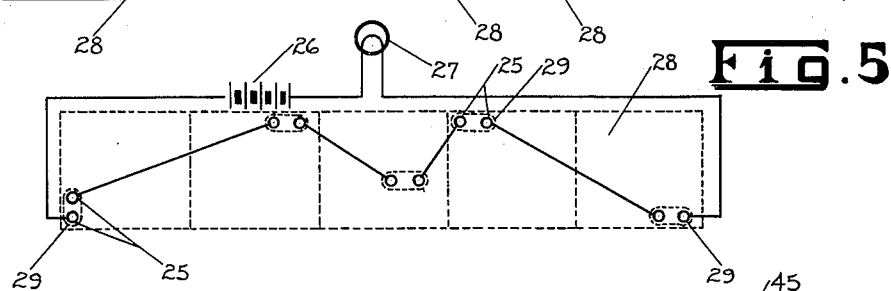
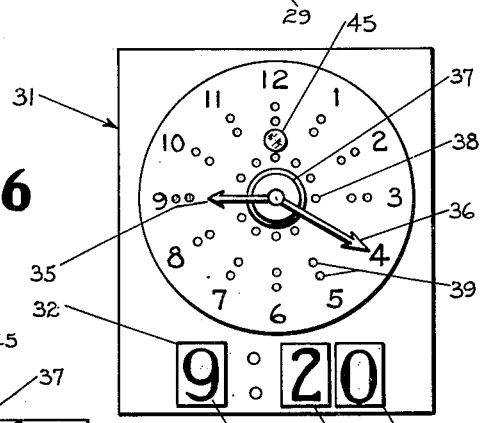
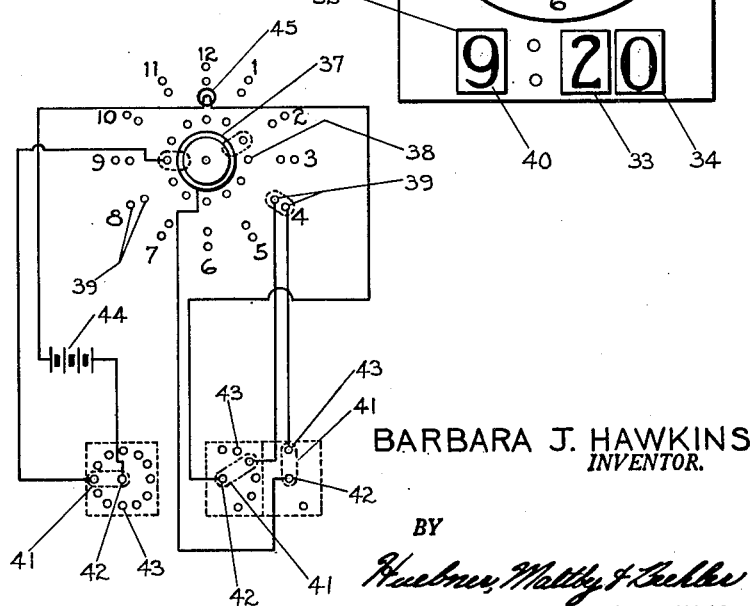
BARBARA J. HAWKINS
INVENTOR.
BY
Huebner, Maltby & Beehler
ATTORNEYS Patented Jan. 23, 1951

2,539,077

UNITED STATES PATENT OFFICE 2,539,077

TEACHING DEVICE

Barbara J. Hawkins, Fresno, Calif.

Application August 31, 1946, Serial No. 694,296

2 Claims. (Cl. 35—22)

This invention relates to educational devices and more particularly to such devices adapted to provide entertainment as well as instruction.

Various devices and apparatus of a general educational nature have heretofore been provided wherein mechanical means have presented problems to the student employing the apparatus; the student has selected an answer from several offered by the apparatus and has made his choice known by pressing a button or other mechanism provided for the purpose; and his answers have been graded and recorded by the apparatus. Such devices and apparatus are costly, contain a plethora of working parts subject to maladjustment and wear, and are limited in their scope of usefulness by expense and time required to adapt the apparatus to different subject matters, teaching techniques, and degrees of student skill and maturity.

An object of my invention, therefore, is to provide a simple, economical, effective and adaptable teaching device.

Another object is to provide an improved teaching device of such simple operation as to be valuably employed with young and unskillful students.

Another object is to provide a teaching device directed to the stimulation of student interest and adapted for use as a toy.

A further object is to provide an educational device automatically signaling successful student responses to problems whose solutions involve the arranging of portions of the device according to a predetermined pattern.

Still further objects, of somewhat more specific nature, are to teach the relationships existing between pictorial representations and other indicia with which the student is familiar and other expressions and embodiments thereof constituting equivalents in meaning; to teach shape, color, shade, size, and meaning discriminations; to teach the concepts of sequence as involved in letters, numbers, stories and the like; and to provide improved elements and arrangements thereof in a device of the character and for the purposes set forth.

In accomplishing these and other objects of the present invention, I have provided improved details of structure, the preferred forms of which are illustrated in the accompanying drawing, wherein:

Fig. 1 is a perspective view of a preferred embodiment of the present invention.

Fig. 2 is a schematic electrical diagram of the device shown in Fig. 1.

Fig. 3 is a fragmentary cross section taken on lines 3—3 of Figs. 1 and 2.

Fig. 4 is a plan view of a modified form of the present invention.

Fig. 5 is a schematic electrical diagram of the device shown in Fig. 4.

Fig. 6 is a plan view of a further modified form of the present invention.

Fig. 7 is a schematic electrical diagram of the form shown in Fig. 6.

Referring more in detail to the drawings:

In Fig. 1, a preferred form of the present invention adapted for use in the lower primary grades is shown. A housing member, thereof, comprising in general a rectangular box structure, is indicated at 10. A plurality of receptacles are formed in the top of the housing member of substantially duplicate sizes and shape adapted to receive in random order panels, presently more fully described. Said receptacles are preferably arranged in rows. For purposes of illustration, two such rows are indicated in Fig. 1. It is to be understood that any convenient number of receptacles in each row, may be employed in any predetermined grouping. In the present illustration, each row is seen to be grouped so as to provide four aligned receptacles 11, closely adjacent to each other, and an additional receptacle 12 spaced from the group of four but aligned therewith.

An electrical signaling means 13, such as a lamp, is mounted in the top of the housing member.

A plurality of panels 14 of a shape and thickness in keeping with the receptacles formed therefor, are provided of dielectric material. Because of the small amount of power required to energize the lamp 13, plastics, glass, fibreboard, wood and a wide range of other materials have proved satisfactory.

Pictorial representations 15, or other selected indicia, are provided on the upper surfaces of the control panels according to the educational objectives toward which learning exercises employing the present device are directed. The panels within each row bear similar representations, but differ from the representations on the panels of the other row. Further, four of the panels in each row are caused to bear substantially identical representations while a fifth bears a representation differing therefrom in some minute particular. In Fig. 1, sample illustrations of the pictorial representations and their proper arrangement in the receptacles are shown. The upper row of panels bear pictures of a plate, knife, fork, and spoon in proper position on four of the panels and in disarranged relationship on the fifth panel. The lower row of panels is provided with representations of trees, four thereof being substantially identical and the fifth differing in certain obvious respects. It is to be understood, that in actual practice, a multiplicity of sets of panels bearing indicia selected in response to preconceived teaching problems and techniques are provided.

Referring to Fig. 2, the electrical system for the embodiment of the invention shown in Fig. 1 is schematically illustrated in full line, in relation to the receptacles 11 and 12 indicated in dashed line. A source of electrical energy 16, such as a flash light battery, serves to energize the lamp 13 when the panels are positioned in predetermined arrangement in the receptacles. Two pairs of contact elements 17 are provided in each of the receptacles. Said contact elements are arranged in substantially identical positions in each receptacle of the adjacent receptacles 11, in both rows. The two pairs of contact elements 12, are provided in substantially identical relative positions therein; positions, however, that differ materially from the positions of the contact elements in the grouped receptacles 11.

Correspondingly positioned contact elements in the receptacles of the top row are electrically connected in series with the dissimilarly positioned pairs of contact elements in the receptacles of the bottom row. There being two pairs of contact elements in each receptacle, two electrical paths thus are available through receptacles, as shown, requiring only conducting bridges between the contact elements to complete said conductive paths. Such bridges 18 are shown in dotted line relationship to the contact elements 17. The two electrical paths described are electrically connected in parallel and thence arranged in series with the lamp 13 and the battery 16. Attention is directed to the fact that once one of the panels bearing one of the matched pictorial representations is positioned in any one of the receptacles 11, of either row, the electrical path, of the two provided in parallel through said rows of receptacles, is thereby selected and the requisite arrangement of the remaining panels to energize the lamp is established. In Fig. 2 the upper pairs of contact elements of the top row of receptacles and the lower pairs of contact elements of the lower row of receptacles are employed. The alternate paths through these receptacles may as easily and conveniently be employed merely by putting the rows of panels in interchanged positions.

In Fig. 3, a fragmentary cross section of means for communicating between the contact elements arranged in pairs, is illustrated. A member forming a bottom of each of the receptacles is indicated at 19 preferably formed of dielectric material, such as wood. A pair of contact elements 17 are illustrated mounted on said member and extending therethrough. Securing nuts 20 serve to maintain the contact elements in proper position. Wires 21, serving to establish the electrical paths between the contact elements arranged in series as described, are secured to the lower end portions of the contact elements by additional nuts 22. A panel bearing a conducting bridge 18 is shown positioned to form electrical conducting communication between the contact elements. In effect, the contact elements 17 and conducting bridge 18 comprises an electrical switching means that is closed only when a panel is inserted in a receptacle in which the contact elements are so disposed to permit the conducting bridge borne by the panel to be engaged thereby.

Access to the interior of the housing member 10 and elements contained therein is permitted through an opening formed in the side of said housing member in which an access panel 23, as shown in Fig. 1, is mounted.

OPERATION

The operation of a teaching device constructed as described is as follows:

A multiplicity of panels 14 bearing pictorial representations and indicia adapted to the particular teaching objectives in mind are furnished the student in a shuffled condition. The instructor preferably has retained one of the matched panels of each type involved in the learning exercise and inserts the same in one of the grouped receptacles 11 in each row. The student is then instructed to sort the panels and to position panels bearing pictorial representations matching those selected by the teacher in the receptacles adjacent to the teacher positioned panels. The student is further instructed to select a panel bearing a pictorial representation similar to the others but minutely differing therefrom and to insert the same in one of the receptacles 12 aligned with the receptacles 11 containing matched panels of the same general type.

When the student has properly sorted and arranged the panels in the receptacles so that the receptacles 11 bear the matching panels and the receptacles 12 bear the dissimilar panels, conducting bridges 18 establish electrical communication between contact elements 17, as illustrated in Figs. 2 and 3, and the electrical circuit is completed, energizing the lamp 13. As long as one or more of the panels are omitted or any of the panels are out of place, the lamp will not be energized.

Modification one

It is frequently desirable to provide students with exercises in which the discrimination required involves understandings and concepts of somewhat greater complexity; such as those involved in story sequence organization, the discrimination between analogous words of progressively differing connotations, the arranging of numbers in ascending or descending order, the arranging of letters to spell words, and the like. To this end, a modified form illustrated in Figs. 4 and 5 is provided.

The top of the housing member 10, in this modified form, has receptacles formed therein in an arrangement differing in certain respects from the arrangement of the receptacles 11 and 12, already described. In this modified form, the top of the housing member has a plurality of aligned receptacles 24 formed therein adjacent to each other.

A pair of contact elements 25, similar to the contact elements 17, are mounted, as shown in Fig. 3, in dissimilar positions in each receptacle, as illustrated in Fig. 5.

In Fig. 5 a schematic diagram of the modified wiring system is shown. A source of electricity 26, an electrical signaling means 27, and the contact elements 25 are wired in series.

Panels 28, similar to the panels 14 and adapted to be received in random order by the receptacles 24, are provided. Each panel bears a conducting bridge 29, similar to the bridges 18, in a position so related to the contact elements in the receptacle into which it is to be received, in providing a successful response to a predetermined teaching exercise, as to engage said respective contact elements.

The panels 28 bear pictorial representations 30 or other indicia adapted to the particular teaching objectives to which the use of the device is directed. A story sequence suitable for kindergarten students is illustrated in the pictorial representations of the five panels shown in Fig. 4 portraying the hatching of a chicken from an egg.

The device is employed by presenting the student with a set of panels bearing selected indicia in shuffled order and instructing him to arrange the panels in the receptacles to illustrate the story. When the child sorts the panels and arranges them in the proper order in the receptacles, the bridges 29 engage their respective contact elements, complete the electrical circuit, and the signaling means 27 indicates a successful response to the problem. Attention is directed to the fact that each of the panels 28 engages its contact points only when inserted in its respective receptacle. Thus, the student operator succeeds in energizing the electrical signaling means only when he positions the panels in the receptacles according to a predetermined arrangement in keeping with the pictorial illustrations or indicia of the panels.

Modification two

The present invention is also advantageously employed to teach the relationships between pictorial representations and other indicia with which the student is familiar, and other analogous expressions and embodiments thereof. A further modification is provided, directed to the furtherance of this particular objective.

In Fig. 6 a housing member, preferably of dielectric material, is indicated generally at 31. The housing member has a clock face formed on the upper portion thereof and aligned receptacles 32, 33 and 34 formed therein, in left to right reading relationship.

An hour hand 35 and a minute hand 36 are pivotally mounted substantially in the center of the clock face so as to traverse said face in the usual manner. The clock hands are constructed of electrical conducting material but are mounted so as to be insulated from each other. Thus, the hands are suitable for bridging electrical contact points without electrically interfering with each other.

An annular member 37, of electrical conducting material, is positioned concentrically on the clock face so as to engage the hour hand 35. Contact points 38 are mounted on the clock face in substantially concentric arrangement with the annular member and one of such contact points is aligned with the pivotal mounting of the hour hand and each of the numbers of the clock face. Further, the contact points 38 are caused to lie within the sweep of the hour hand. Thus, as the hour hand is pointed to any number on the clock face said hand establishes electrical contact between the annular member and a respective hour hand contact point. Beyond the sweep of said hour hand, minute hand contact points 39 are provided. The minute hand contact points are grouped in pairs, one of said pairs being substantially aligned with the pivotal mounting of the minute hand and each of the numbers of the clock face. Thus, as the minute hand is pointed at any number on the clock face, electrical communication is established between a respective pair of contact points 39.

Panels 40, similar to the panels 14 and 28 already described, are adapted to be received by the receptacles 32, 33, and 34. As shown in Fig. 6, the panels bear numerals from zero to twelve inclusively whereby times represented by the clock face and positioned hands may be numerically indicated. Said panels also bear electrical conducting bridges 41 similar to the bridges 18, as illustrated in Fig. 3, and are deployed in substantially identical positions on panels bearing the same numerals, said positions being distinctive for each numeral except that the "0" panels and "12" panels bear similarly positioned bridges for reasons soon to become apparent. Electrical contact elements 42 and electrical selector elements 43 are provided in each receptacle as shown schematically in Fig. 7; twelve selector elements being required in receptacle 32 to indicate the twelve hours of the clock face, six being required in receptacle 33 to indicate tens of minutes of each hour, and two being required in receptacle 34 to indicate the minutes in units of five. It is to be understood that additional contact elements may be provided in receptacle 34 when it is desired to indicate the minutes of time in smaller units. It has been found convenient to position a contact element 42 substantially in the center of each of the receptacles and arranged the selector elements in circumscribing relation thereto. Further, respective selector elements in each receptacle must be positioned in substantially the same relative positions so that any panel may be inserted into any receptacle and its bridge will establish electrical communication between the contacting element of the receptacle and its proper selector element, as long as the number of the panel is such as to be within the range of the receptacles into which it is inserted.

In Fig. 7, a source of electrical energy 44 is wired in series with an electrical signaling means 45 between the contact element of receptacle 32 and the contact element of receptacle 33. Between said receptacle contact elements, a plurality of electrical paths are provided through the receptacles and associated with the clock hands and their respective contact points so that the positioning of the clock hands conditions the contact elements in the receptacles to energize the signaling means when panels bearing the proper numerals portraying the indicated times are positioned in said receptacles.

For purposes of simplification a single such illustrative path is shown in Fig. 7, such path being the one employed when the clock hands are positioned to indicate a time of "9:20".

When the hour hand is pointed at "9," electrical communication is established between the annular member 37 and the contact point 38 aligned with the "9" on the clock face. To assure that only panels bearing the numeral "9" may be employed in receptacle 32 in successive response to the 9 o'clock position of the hour hand, said contact point is wired to its respective selector element in the receptacle 32. Thus, when a "9" panel is positioned in receptacle 32 the electrical path is complete from the battery to the annular member 37. Said annular member is electrically connected to the contact element 42 of receptacle 34. Referring again to the clock face, it is seen that the minute hand in its "20-minute" position, pointed at the "4" on the clock face, establishes electrical communication between the minute hand contact points 39 aligned with the said "4" of the clock face. One of the said pair of contact points is electrically connected to the selector element in receptacle 33 contacted by the bridges of panels bearing the numeral 2. To provide the "0" of the time indicated, electrical communication is established between the remaining contact point 39 and the selector element in receptacle 34 engaged by panels bearing "0".

Thus it is seen, that the setting of the clock hands to indicate any selected time results in a conditioning of the receptacles such as to permit the energizing of the electrical signaling means upon the positioning of numeral bearing panels, in said receptacles, in a numerical indication of said clock indicated time.

Although I have herein shown and described my invention in what I have conceived to be the most practical and preferred embodiments, it is recognized that departures may be made therefrom within the scope of my invention, which is not to be limited to the details disclosed herein, but is to be accorded the full scope of the claims so as to embrace any and all equivalent devices and systems.

Having described my invention, what I claim as new and desire to secure by Letters Patent is:

1. An educational device comprising a housing having a plurality of receptacles of substantially the same size and shape formed therein, a plurality of panels individually fitted to the receptacles adapted to be received by the receptacles in random order and each bearing indicia suggestive of a predetermined ordered arrangement of the panels, a pair of spaced electrical contacts mounted in each of the receptacles in the housing, the contacts of each receptacle being positioned relative to their respective receptacle differently from the positioning of the contacts in every other receptacle, electrical conducting bridges mounted on the panels in positions adapted to bridge the contacts in the receptacles when the panels are arranged in the receptacles according to their predetermined ordered arrangement, and an electrical circuit connecting the contacts in series and including an electrical signaling means energized by bridging of the contacts.

2. An educational device comprising a plurality of sets of panels, each set being distinctive in at least one predetermined particular from each other set and each set consisting of a plurality of panels a number of which bear matched indicia and one of which bears slightly dissimilar indicia; a housing member having receptacles of a common shape and size formed therein adapted to receive the panels in random order, the receptacles being arranged in a plurality of sets and each set providing a number of grouped receptacles and a receptacle spaced therefrom; electrical bridges borne by the panels, the bridges of the matched panels of each set being correspondingly positioned thereon, and the panel of each set bearing a slightly dissimilar indicia having its bridge dissimilarly positoned relative to the bridges of the other panels of the set, the bridges of each set of panels being distinctively positioned as compared to the bridges of the panels of each other set; a plurality of pairs of contacts mounted in the receptacles, the grouped receptacles of each set providing pairs of similarly positioned contacts engageable by the bridges of the panels bearing matched indicia, and the spaced receptacles providing pairs of similarly positioned contacts individually engageable by the bridges of the panels of the various sets bearing the dissimilar indicia; and an electrical circuit including a source of electrical energy and an electrical signal, interconnecting the pairs of contacts of each set of receptacles engageable by the bridges of each set of panels in series, the series connected contacts of each set of receptacles in parallel, and the parallel circuits of the sets of receptacles in series with the electrical signal and source of electrical energy.

BARBARA J. HAWKINS.

REFERENCES CITED

The following references are of record in the file of this patent:

UNITED STATES PATENTS

| Number | Name | Date |
|---|---|---|
| 1,647,276 | Daman | Nov. 1, 1927 |
| 2,148,259 | Cisin | Feb. 21, 1939 |
| 2,352,182 | Brown | June 27, 1944 |
| 2,416,959 | Segal | Mar. 4, 1947 |

FOREIGN PATENTS

| Number | Country | Date |
|---|---|---|
| 569,331 | Great Britain | May 17, 1945 |